(12) United States Patent
Silverstein et al.

(10) Patent No.: US 11,019,498 B2
(45) Date of Patent: May 25, 2021

(54) CONFERENCE PARAMETER SETTING BASED ON LOCATIONAL ATTRIBUTES

(71) Applicant: INTERNATIONAL BUSINESS MACHINES CORPORATION, Armonk, NY (US)

(72) Inventors: Zachary A. Silverstein, Austin, TX (US); Madeleine Eve Barker, Atlanta, GA (US); Michael Seth Silverstein, Jacksonville, FL (US); Robert Huntington Grant, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/508,767

(22) Filed: Jul. 11, 2019

(65) Prior Publication Data
US 2021/0014676 A1    Jan. 14, 2021

(51) Int. Cl.
*H04W 4/06*        (2009.01)
*H04W 12/37*       (2021.01)
(Continued)

(52) U.S. Cl.
CPC ......... *H04W 12/37* (2021.01); *H04L 12/1818* (2013.01); *H04W 4/029* (2018.02); *H04W 4/06* (2013.01); *H04W 12/02* (2013.01)

(58) Field of Classification Search
CPC ... H04W 12/0027; H04W 4/06; H04W 4/029; H04W 12/02; H04L 12/1818
See application file for complete search history.

(56) References Cited

U.S. PATENT DOCUMENTS 6,795,544 B1   9/2004   D'Arcy et al.
7,996,048 B1   8/2011   Mikan et al.
(Continued)

FOREIGN PATENT DOCUMENTS

WO    2017034516 A1    3/2017

OTHER PUBLICATIONS

Anonymous, "Cost of a Data Breach Study", IBM, <https://www.ibm.com/security/data-breach>, Accessed Jul. 9, 2019, 7 pages.
(Continued)

*Primary Examiner* — Chuong A Ngo
(74) *Attorney, Agent, or Firm* — Brian Restauro; Andrew D. Wright; Roberts Calderon Safran & Cole, P.C.

(57) ABSTRACT

A computer-implemented method includes: receiving, by a computer device, conference information defining parameters of a conference; receiving, by the computer device, conference constraints relative to location types; generating, by the computer device, a rule set based on the conference constraints and the location types; obtaining, by the computer device, location information of participant devices connected to the conference; determining, by the computer device and for each one of the participant devices connected to the conference, whether one of the conference constraints applies to the one of the participant devices based on the location of the one of the participant devices and the rule set; and in response to determining that one of the conference constraints applies to the one of the participant devices, the computer device applying the one of the conference constraints applies to the one of the participant devices.

20 Claims, 4 Drawing Sheets

(51) Int. Cl.
  *H04L 12/18* (2006.01)
  *H04W 12/02* (2009.01)
  *H04W 4/029* (2018.01)

(56) References Cited

U.S. PATENT DOCUMENTS

| | | | |
|---|---|---|---|
| 8,654,953 | B2 | 2/2014 | Boss et al. |
| 9,571,628 | B1 | 2/2017 | Bostick et al. |
| 10,083,319 | B2 | 9/2018 | Wilmes |
| 2005/0044503 | A1* | 2/2005 | Richardson ........... H04L 65/403 715/753 |
| 2005/0084086 | A1* | 4/2005 | Hesse ................. H04L 12/1818 379/202.01 |
| 2005/0277428 | A1 | 12/2005 | Nathan Brown |
| 2009/0322890 | A1 | 12/2009 | Booking et al. |
| 2010/0067680 | A1 | 3/2010 | Hanson et al. |
| 2012/0254382 | A1 | 10/2012 | Watson et al. |
| 2013/0078962 | A1 | 3/2013 | Clarke et al. |
| 2013/0254831 | A1 | 9/2013 | Roach et al. |
| 2014/0187200 | A1 | 7/2014 | Reitter et al. |
| 2015/0023487 | A1 | 1/2015 | Gisby et al. |

OTHER PUBLICATIONS

Wallis, "Talking Business in Flight? Be Careful", The New York Times, <https://www.nytimes.com/2012/05/03/business/taking-business-calls-on-the-train-watch-what-you-say.html>, May 2, 2012, 6 pages.

Hughes, "Overheard Information: An Overlooked Corporate Security Threat", Biamp., <https://cambridgesound.com/overheard-information-an-overlooked-corporate-security-threat/>, Apr. 15, 2015, 5 pages.

Hess, "Overheard conversations: When heightened mobile security fails to protect", ZDNet, <https://www.zdnet.com/article/overheard-conversations-when-heightened-mobile-securityfails-to-protect/>, Jul. 9, 2013, 13 pages.

Anonymous, "Location Secured and Policy Controlled Video Calling and Conferencing solution capability", IP.com, IPcom No. IPCOM000244664D, Jan. 6, 2016, 6 pages.

* cited by examiner

Time = t1

Time = t2

CONFERENCE PARAMETER SETTING BASED ON LOCATIONAL ATTRIBUTES

BACKGROUND

The present invention relates generally to mobile device-based conferencing and, more particularly, to conference parameter setting based on locational attributes.

People routinely conduct conference calls and web meetings using their mobile devices, such as smartphones. Mobile devices, and the conference software running on them, provide a wide range of functionality during conferences, such as using the mobile device speaker to output audio of the conference and using the mobile device display to output video of the conference.

SUMMARY

In a first aspect of the invention, there is a computer-implemented method including: receiving, by a computer device, conference information defining parameters of a conference; receiving, by the computer device, conference constraints relative to location types; generating, by the computer device, a rule set based on the conference constraints and the location types; obtaining, by the computer device, location information of participant devices connected to the conference; determining, by the computer device and for each one of the participant devices connected to the conference, whether one of the conference constraints applies to the one of the participant devices based on the location of the one of the participant devices and the rule set; and in response to determining that one of the conference constraints applies to the one of the participant devices, the computer device applying the one of the conference constraints applies to the one of the participant devices.

In another aspect of the invention, there is a computer program product including a computer readable storage medium having program instructions embodied therewith. The program instructions are executable by a computer device to cause the computer device to: generate a rule set based on conference constraints and location types defined by an organizer of a conference, wherein the conference comprises one of a conference call and a web meeting, and wherein the rule set defines a first set of the conference constraints with the first location type and a second set of the conference constraints with the second location type; apply the first set of the conference constraints to a first one of the participant devices based on determining the first one of the participant devices is in a location of the first location type; and apply the second set of the conference constraints to a second one of the participant devices based on determining the second one of the participant devices is in a location of the second location type.

In another aspect of the invention, there is system including: a conference server comprising a processor, a computer readable memory, and a computer readable storage medium; program instructions to receive conference information, conference constraints, and location types via input provided by an organizer of a conference; program instructions to generate a rule set based on the conference constraints and the location types; program instructions to connect plural participant devices during the conference; program instructions to receive location information from each of the plural participant devices during the conference; program instructions to adjust a functionality of at least one of the plural participant devices during the conference based on the rule set and the location information of the at least one of the plural participant devices. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
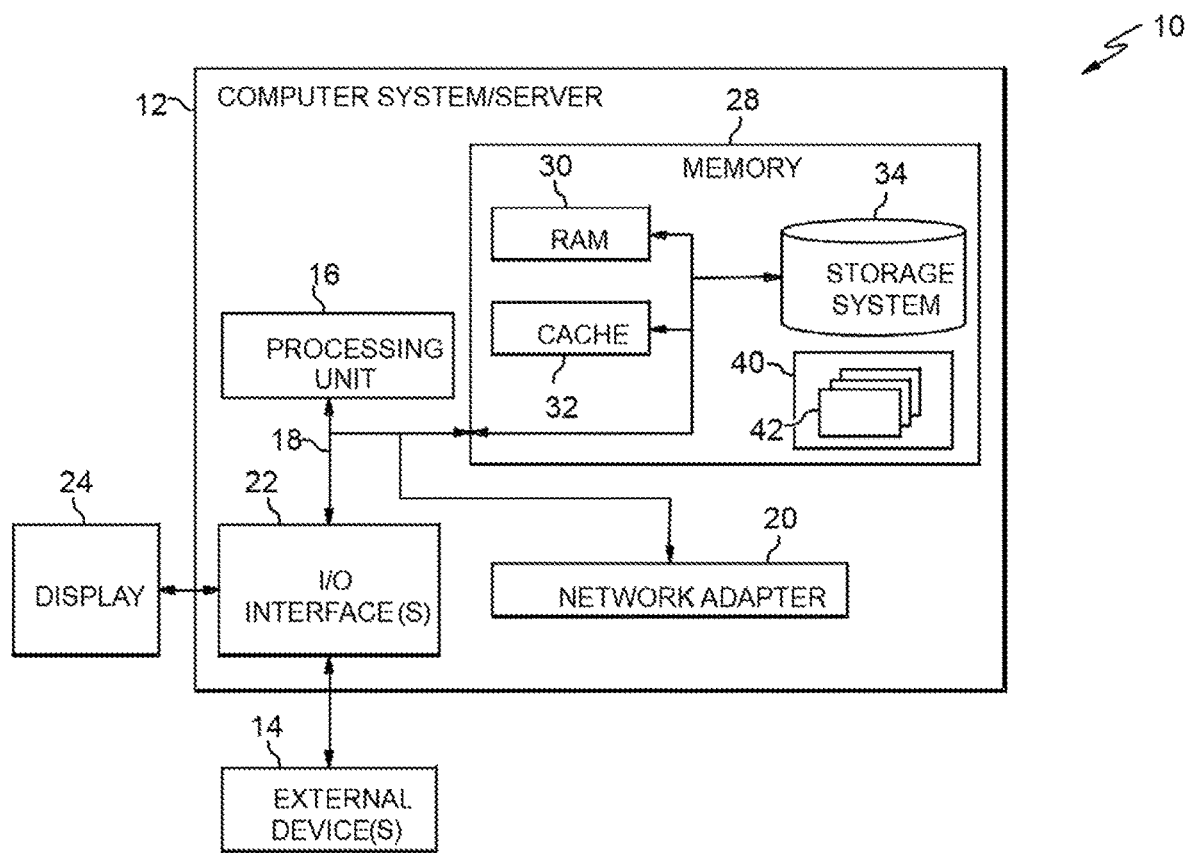
FIG. 1 depicts a computer infrastructure according to an embodiment of the present invention.

The present invention relates generally to mobile device-based conferencing and, more particularly, to conference parameter setting based on locational attributes. Often times, people take critical or sensitive calls on their mobile devices (e.g., smartphones) in locations that are not private and that pose risks to the confidentiality of the conversation. However, calls on mobile devices are still extremely useful to maintaining work efficiency on the move. Aspects of the invention are directed to minimizing the risk of the content of a call being inadvertently shared with people who are not on the call but are in the vicinity of another person who is on the call.

According to aspects of the invention, a system obtains metadata of devices that are connected to a conference (e.g., a conference call or an online meeting), and imposes constraints on the conference-related functionality of those devices based on the metadata. In embodiments, the system obtains location information from the devices that are connected to a conference and applies user-defined constraints to the devices based on their respective locations. In some implementations, the constraints are based on locations being designated as public or private, secure or unsecure, or low risk, medium risk, or high risk. As described herein, manageable attributes may include one or more of include speakerphone/headset control, outgoing audio muting, and risk notification to call parties.

To the extent implementations of the invention collect, store, or employ personal information provided by, or obtained from, individuals (for example, Internet cookies, cache, browsing history, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Embodiments of the invention improve the technology of mobile device-based conferencing by providing users with security enhancements that alter the functionality of devices connected to the conference based on the device location. Embodiments of the invention employ an unconventional arrangement of steps. For example, the step of generating a rule set creates new information that does not exist in the system, and this new information is then used in subsequent steps in an unconventional manner. Embodiments of the invention also utilize elements and/or techniques that are necessarily rooted in computer technology, including presenting device location determination via GPS, for example.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
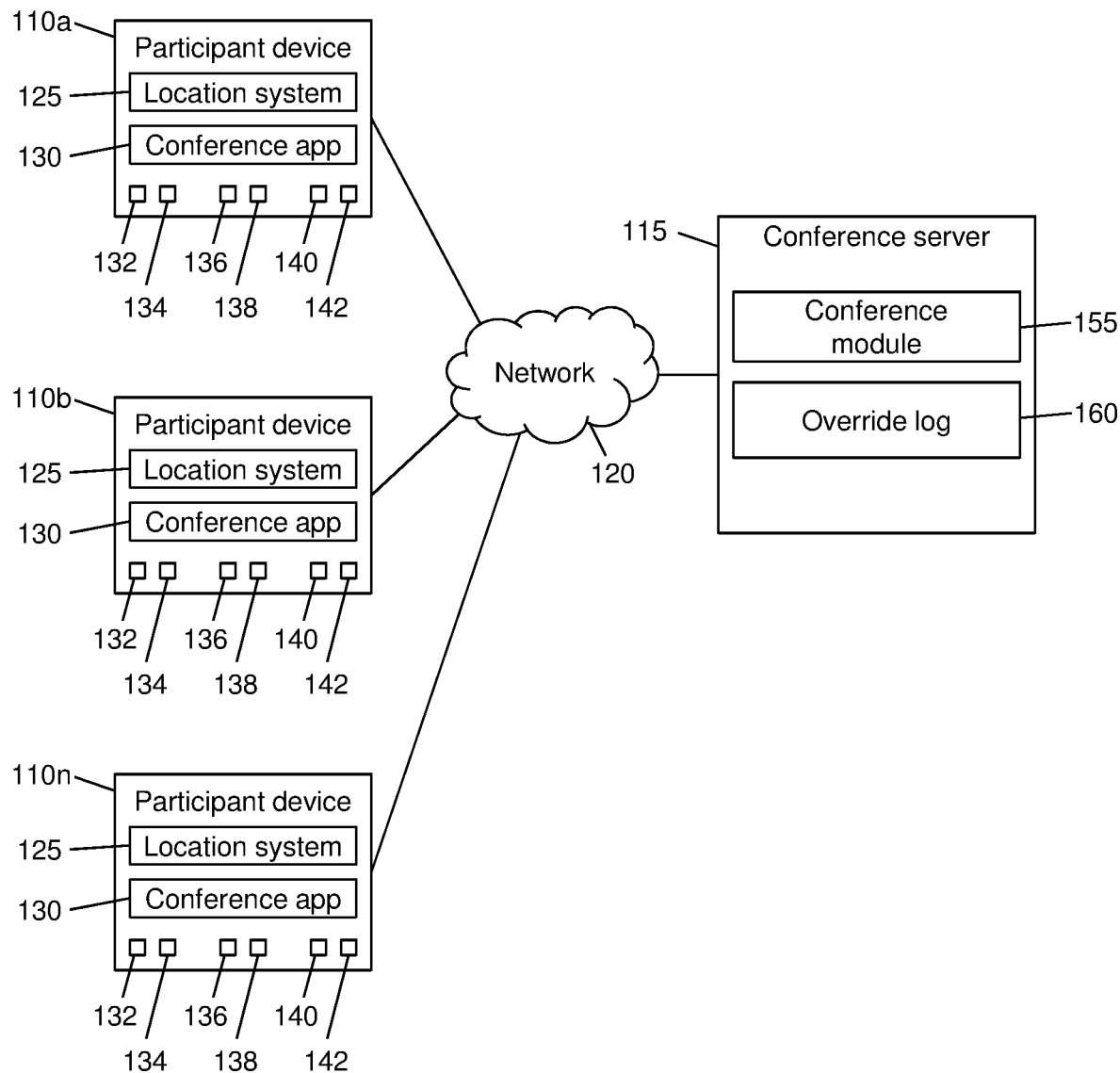
FIG. 2 shows a block diagram of an exemplary environment in accordance with aspects of the invention.

FIG. 2 shows a block diagram of an exemplary environment in accordance with aspects of the invention. The environment includes a number of participant devices 110a-n each connected to a conference server 115 via a network 120. In embodiments, the network 115 is a communication network such as a LAN, WAN, or the Internet, or a combination of two or more such communication networks.

According to aspects of the invention, each of the participant devices 110a-n comprises a computer device that is configured to perform conferencing functions for its respective user. As used herein, a conference (or conferencing) refers to a conference call (e.g., exchanging audio amongst plural participants) or an online meeting (e.g., exchanging audio and/or video amongst plural participants). To this end, in embodiments, each of the participant devices 110a-n comprises a computer device such as a laptop computer, tablet computer, smartphone, etc., and may include one or more elements of computer system 12 of FIG. 1. In embodiments, each of the participant devices 110a-n comprises a location system 125 that is configured to determine a location of the respective device (e.g., via Global Positioning System (GPS)) and a conference app 130 that is a client program configured to connect the receptive device to a conference hosted by the conference server 115. Each of the participant devices 110a-n may also comprise components including but not limited to: a microphone 132 for capturing audio (e.g., speech) emitted by a user; an audio speaker 134 for emitting audio to the user; a camera 136 for capturing video images of the user; a display screen 138 for displaying video output to a user; an input system 140 including one or more of a touchscreen (e.g., incorporated in the display screen), a mouse device, a trackpad, a keyboard, and a keypad; and a headphone port 142 for connecting headphones.

According to aspects of the invention, the conference server 115 is a computer device that is configured provide conference services to the participant devices 110a-n, e.g., in a client-server arrangement. For example, the conference server 115 may be configured to receive audio and/or video signals from the participant devices 110a-n, and to generate and transmit respective audio and/or video signals to each of the participant devices 110a-n during a conference. In accordance with aspects of the invention, the conference server 115 is configured to apply location based restrictions to the participants during the conference in the manner described herein. In implementations, the conference server 115 is a computer device that comprises one or more elements of computer system 12 of FIG. 1, which stores and runs one or more program modules that perform functions described herein. In embodiments, the conference server 115 comprises conference module 155, which comprises one or more program modules such as program module 42 as described with respect to FIG. 1.

In embodiments, separate modules of the conference server 115 may be integrated into a single module. Additionally, or alternatively, a single module of the conference server 115 may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

Still referring to FIG. 2, in accordance with aspects of the invention, the conference module 155 is configured to host a conference amongst users of the participant devices 110a-n via the network 120. The conference module 155 permits a user of the one of the participant devices 110a-n to create and configure a conference by providing input that defines, for example, a date of the conference, a time of the conference, connection information of the conference (e.g., dial in number, website link, access code, etc.), and invitees of the conference. As used herein, the term "organizer" refers to a user that creates and configures (e.g., sets up) a conference, the terms "invitee" refer to another user that is invited to join the conference, and the term "attendee" refers to any user that is connected to the conference.

For example, in the diagram shown in FIG. 2, the user of participant device 110a may provide input to their participant device 110a to create a new conference, e.g., via the conference app 130. The input may include, for example, a date of the conference, a time of the conference, connection information including a dial in number, a website link, and an access code, and an indication of invitees of the conference including an email address of each invitee. In embodiments, the conference module 155 receives this information from the organizer's participant device 110a, stores data defining the conference, and forwards an invite to each of the invitee participant devices 110a and 110n (e.g., via the indicated email addresses). Then, at the date and time of the conference, the organizer and each of the invitees connects to the conference by providing the connection information via their respective participant devices 110a-n. During the conference, the conference module 155 receives audio and/or video from each of the participant devices 110a-n, and generates and outputs (in near real time) a respective audio/video signal stream to each of the participant devices 110a-n. The conference permits the users to talk to each other via their participant devices. The conference may also permit one or more of the users to share the display of their participant device with the other users. The conference may also permit one or more users to share video of themselves during the conference, e.g., in the manner of a video conference.

With continued reference to FIG. 2, according to aspects of the invention, the conference module 155 is further configured to determine whether to impose device constraints on one or more of the participant devices 110a-n during the conference, where the device constraints are defined by the organizer and are based on locations of the participant devices 110a-n that are connected to the conference. In embodiments, the device constraints affect the functionality of a participant device during the conference and include one or more of: disabling the speaker of the participant device (e.g., so that the user cannot use the speakerphone option); muting the microphone of the participant device (e.g., so that the user cannot speak to others in the conference); preventing the participant device from displaying screens shared by other participant devices in the conference (e.g., so that the user cannot see screens shared by others in the conference); preventing the participant device from displaying video from other participant devices in the conference (e.g., so that the user cannot see video feed shared by others in the conference); and preventing the participant device from transmitting the audio signal of the conference to an external speaker (e.g., so that the user cannot play the audio of the conference on a paired device). This list of constraints is not limiting, and other constraints may be used in implementations of the invention.

In accordance with aspects of the invention, the system permits the organizer to define one or more rules for a conference. Each rule includes a location type and one or more constraints associated with the location type. Location types may comprise, for example, low risk, medium risk, and high risk. Other location types may be used, including public and private, or secure and unsecure, for example.

In embodiments, the organizer uses the conference app 130 to define the rules for a conference. The rules may be defined as part of the configuration of the conference, e.g., at the same time and using the same interface as when the organizer provides input to define the conference information such as date, time, connection information, and invitees. For example, the organizer may use a user interface (UI) of the conference app 130 to provide input to define the following rules for a conference: low risk locations have no constraints; medium risk locations have constraints including disabling the speaker of the participant device and preventing the participant device from transmitting the audio signal of the conference to an external speaker; high risk locations have constraints including disabling the speaker of the participant device, preventing the participant device from transmitting the audio signal of the conference to an external speaker, and preventing the participant device from displaying screens shared by other participant devices in the conference. In this example, the first location type has rules R1, the second location type has rules R1+R2, and the third location type has rules R2+R3, although embodiments of the invention are not limited to having cumulative rules in this manner.

According to embodiments of the invention, the system permits the organizer to define specific locations as being one of the location types used in the rules. For example, using the UI of the conference app 130, the user may provide input to associate a street address (e.g., number, street, city, state, and postal code) with a location type (e.g., one of low risk, medium risk, and high risk). Additionally or alternatively, the user may draw a shape on a map and designate all locations within that shape as a location type (e.g., one of low risk, medium risk, and high risk). In a particular embodiment, the user provides input to define one or more low risk locations and one or more high risk locations, and any location not specified by the user as low risk or high risk is automatically treated as a medium risk location. In another particular embodiment, there are only two location types (e.g., secure and unsecure), and the user provides input to define secure locations, and any location not specified by the user as secure is automatically treated as an unsecure location.

In accordance with aspects of the invention, during the conference the conference module 155 periodically obtains the location of each participant device 110*a-n* connected to the conference, e.g., via the location system 125 of each connected participant device 110*a-n*. In embodiments, for each connected participant device 110*a-n*, the conference module 155 determines whether any constraints apply to this participant device based on comparing the location of the participant device to the rules. In a particular embodiment, the conference module 155 receives a GPS location of a participant device (e.g., participant device 110*b*), determines a location type (e.g., low risk, medium risk, and high risk) based on the GPS location, analyzes the rules for this conference to determine which constraints apply to the determined location type, and applies the determines constraints to the participant device 110*b*.

Advantageously, the system is configured to apply different constraints to different ones of the participant devices 110*a-n* during a conference as a result of the participant devices 110*a-n* being in different location types during the conference. For example, during the conference, a first participant device 110*a* might be in a first location that is low risk, a second participant device 110*a* might be in a second location that is medium risk, and a third participant device 110*a* might be in a third location that is high risk. In accordance with aspects of the invention, the conference module 155 applies different constraints to the different participant devices 110*a-n* based on their different locations.

In accordance with aspects of the invention, the conference module 155 is configured to change the constraints applied to a respective participant device during the conference in response to the location of the participant device changing from one location type to another location type. For example, in the event that a participant device moves from a high risk location to a low risk location during the conference, the conference module 155 changes the constraints applied to the participant device based on this change in location.

According to further aspects of the invention, the system permits a same organizer to define different rules for different conferences. The rules for a particular conference can thus be considered as part of the configuration of a conference similar to the date, time, connection information, and invitees. In this manner different conferences can have different rules.

In further aspects, the system permits a user to define and save plural different rule sets. This way, when the user is creating a conference, the user may select one of their saved rule sets to apply to the conference being created. One of the saved rule sets may be designated as a default confidential rule set.

In further aspects, the system is configured to analyze the conference invite and automatically apply a rule set to the conference based on the analyzing. In embodiments, the conference module 155 analyzes the text of the conference invite (e.g., the message, note, or email that is sent to each invitee) using natural language processing (NLP), such as natural language understanding (NLU) and/or natural language classification (NLC), to determine whether the conference should be treated as confidential. In the event the conference module 155 determines, based on analyzing the conference invite, that the conference deals with confidential information, then the conference module 155 automatically applies the default confidential rule set to all participant devices that connect to the conference. In embodiments, the automatically applied rule set is applied in addition to any user-defined rules for the same conference. In this manner, a single conference may have rules that are input by the organizer as part of the conference configuration, and also may have rules that are automatically applied based on the system determination that the conference deals with confidential information. In particular embodiments, for privacy concerns the system only analyzes the conference invite, and does not analyze the conversation (e.g., words spoken by the users) during the conference.

According to additional aspects of the invention, the system permits a user to override a constraint that is currently applied to their participant device during a conference. In embodiments, each participant device displays a user interface (UI) via the conference app 130 during the conference, and the UI has a field that the user can select to override a constraint that is currently applied to the participant device. In aspects, when the user provides input to override a constraint, the conference module 155 stops applying the constraint to the participant device and stores data in an override log 160 that defines the override. The stored override data can include, for example, an ID of the conference, an ID of the user that performed the override, the location of the participant device when the override occurred, the location type of the participant device when the override occurred, and the constraint that was overridden. In embodiments, the data stored in the override log 160 is saved and can be searched at a later date to determine the facts associated with any particular override occurrence. In further embodiments, some or all of the override data is provided to the organizer in real time, e.g., during the conference in response to the other attendee initiating the override. In this manner, the organizer is immediately informed of an override when it occurs, and can act accordingly.

In even further embodiments, the UI permits an attendee to input a comment when they initiate an override. For example, the UI may include a text field in which the user may type text of a comment associated with an override the attendee is currently making. In this implementation, the comment is saved in the override log 160 as part of the override data. The comment may also be displayed to the organizer, e.g., similar to the other override data.

In still further embodiments, when an attendee initiates an override of a constraint, the system causes the UI of the attendee's participant device to display information prior to removing the constraint. The information may include, for example, one or more of: a reminder that the conference should be treated as confidential; and a display of the override data that will be saved in the override log.

In even further embodiments, when an attendee initiates an override of a constraint, the system determines a location nearest the attendee's current location in which the constraint being overridden would not apply to the attendee and, therefore, would not need to be overridden. In this aspect, when an attendee initiates an override of a constraint, the system determines whether a lower risk location is within a predefined distance of the attendee's current location. If the system does find a lower risk location within a predefined distance of the attendee's current location, then the system causes the UI of the attendee's participant device to display information indicating the lower risk location. In this manner, the attendee may choose to move to the identified lower risk location rather than continue with the override. When the system does find a lower risk location in this manner, the system may be configured to prompt the attendee to confirm whether they wish to continue with the override. If the attendee responds to the prompt by providing input to confirm the override, then the system removes the constraint and logs the override. On the other hand, if the attendee responds to the prompt by providing input to cancel the override, then the system cancels the override request without performing the override.

Figure 3A:
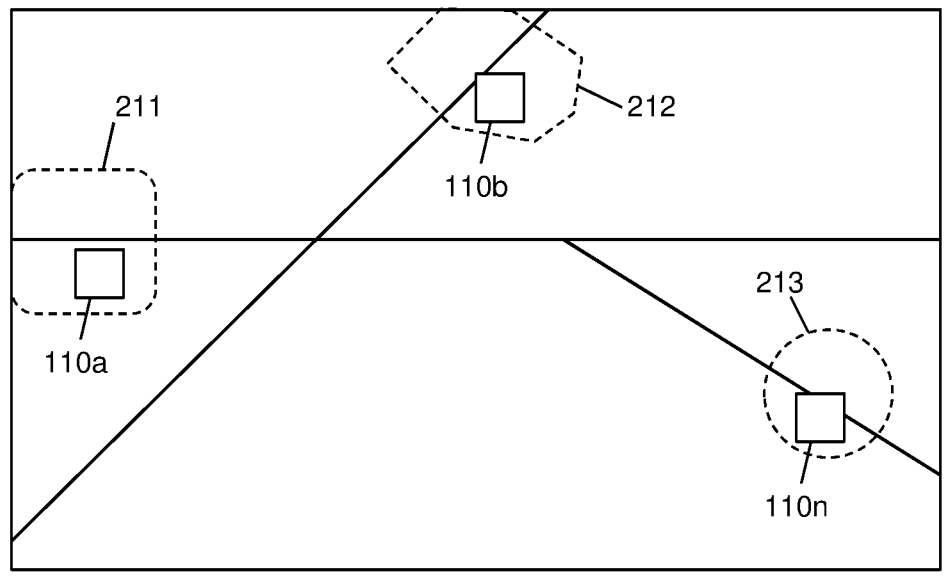
FIGS. 3A and 3B illustrate an exemplary use case in accordance with aspects of the invention.
Figure 3B:
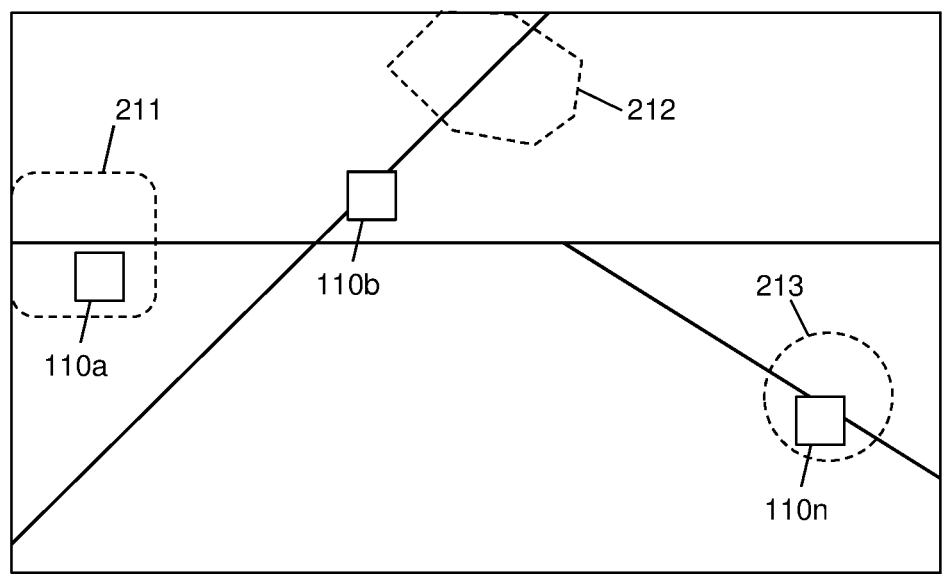

FIGS. 3A and 3B illustrate an exemplary use case in accordance with aspects of the invention. Actions of the use case may be carried out in the environment of FIG. 2 and are described with reference to elements depicted in FIG. 2.

FIG. 3A shows the locations of plural participant devices 110a, 110b, 110n at a first time t1 during a conference. In this example, the user of participant device 110a is the organizer and has created the conference using the conference app 130. In particular, the organizer provided input to the conference app 130 to define conference information such as conference date, conference time, conference connection information, and conference invitees, which in this case are the users of participant devices 110b and 110n. In this example, the organizer also defined location 211 as low risk, location 212 as high risk, and location 213 as high risk, also by providing input via the conference app 130. Also in this example, the organizer provided input via the conference app 130 to define the following constraints for the respective location types: low risk locations have no constraints; medium risk location have the constraint of speakerphone and external speakers are disabled; and high risk locations have the constraints of speakerphone and external speakers are disabled, as well as receiving shared screens is disabled.

Still referring to the example shown in FIG. 3A, at time t1 during the conference each of the participant devices 110a, 110b, 110n is connected to the conference, e.g., via the network 120 and the conference server 115. At time t1, each of the participant devices 110a, 110b, 110n transmits its current location to the conference server 115. Based on the current locations, the conference module 155 determines that the participant device 110a is in a low risk location (i.e., location 211) and does not apply any constraints to the participant device 110a. The conference module 155 also determines that the participant device 110b is in a high risk location (i.e., location 212) and accordingly applies the high risk location constraints (i.e., disabled speakerphone, disabled external speakers, and disabled screen sharing) to the participant device 110b. The conference module 155 also determines that the participant device 110n is in a high risk location (i.e., location 213) and accordingly applies the high risk location constraints (i.e., disabled speakerphone, disabled external speakers, and disabled screen sharing) to the participant device 110n.

With continued reference to the example shown in FIG. 3A, the user of the participant device 110n is made aware of the constraints applied to their device, e.g., by output in the UI of the conference app 130 on their device. In this example, the user of the participant device 110n determines that, although they are in a high risk area, they are confident that no other people are in the vicinity that might overhear the conference if the conference were output on the speakerphone of the participant device 110n. Based on this, the user of the participant device 110n provides input to the UI of the conference app 130 to override the constraint that disables the speaker on their device. The conference server 155 receives the override input, stores the override data for this override in the override log, notifies the organizer of this override, and then removes the overridden constraint from the participant device 110n. In this manner, the user of the participant device 110n is now able to use the speakerphone function of their device to output the audio of the conference.

FIG. 3B shows the locations of the participant devices 110a, 110b, 110n at a second time t2 during the same conference as depicted in FIG. 3A, with time t2 being some time after time t1. As shown in FIG. 3B, the participant device 110b has moved to a new location. In accordance with aspects of the invention, the participant device 110b sends its current location to the conference server 115, and the conference module 155 determines that the participant device 110b is not in a high risk location and is not in a low risk location. As described herein, in some embodiments, all locations that are not defined as a low risk location or a high risk location are automatically deemed to be a medium risk location. As a result of the participant device 110b moving out of the high risk location 212 at time t2, the conference module 155 stops applying the high risk location constraints to the participant device 110b, and begins applying the medium risk location constraints to the participant device 110b. The constraints applied to the participant device 110a (i.e., no constraints) and to the participant device 110n (i.e., high risk location constraints, but overridden to enable speakerphone) remain unchanged at time t2 since the respective locations of these devices does not change from time t1 to time t2.

In another exemplary use case, Zach is the organizer of a conference for an internal Q&A call about an upcoming earning report for an enterprise. Zach wants to make sure that the highly sensitive conversation's risks are constrained as much as possible. When configuring the conference, Zach sets call constraints mandating that any area geofenced as unsecure must disable speakerphone and outgoing audio. Zach provides input (or the system refers to stored data) that defines a first location (e.g., the enterprise office location) and a second location (e.g., a trusted location) as secure. The system registers geofenced parameters for these locations, and defines all other locations and unsecure.

With continued reference to this example, Rob dials into Zach's conference using his participant device. The system obtains the GPS location of Rob's device and determines that Rob is at the first location (i.e., the enterprise office location). Based on this determination of Rob being at a secure location, the system does not apply any constraints to Rob's device during the conference, and Rob is permitted to use the speakerphone on his device during the conference.

Still referring to this example, Maddie dials into Zach's conference using her participant device. Maddie is currently on a business trip, but is a necessary participant for this call. The system obtains the GPS location of Maddie's device and determines that Maddie is not at the first location or the second location. Based on this determination of Maddie being at an unsecure location, the system applies the defined constraints to Maddie's device during the conference, i.e., Maddie's device is prevented from outputting the audio of the conference via its speaker, and is also prevented from transmitting outgoing audio (e.g., the microphone is disabled). However, Maddie is in a private area without any other people around that might hear her speaking during the call. Accordingly, Maddie provides an override input via her device, the override being to remove the constraint that prevents outgoing audio from her device. The system removes the constraint from Maddie's device, thereby permitting her device to transmit her speech during the conference. Zach is notified that Maddie has bypassed the security module, but as an expected party doesn't take any further action to restrict her communication.

Figure 4:
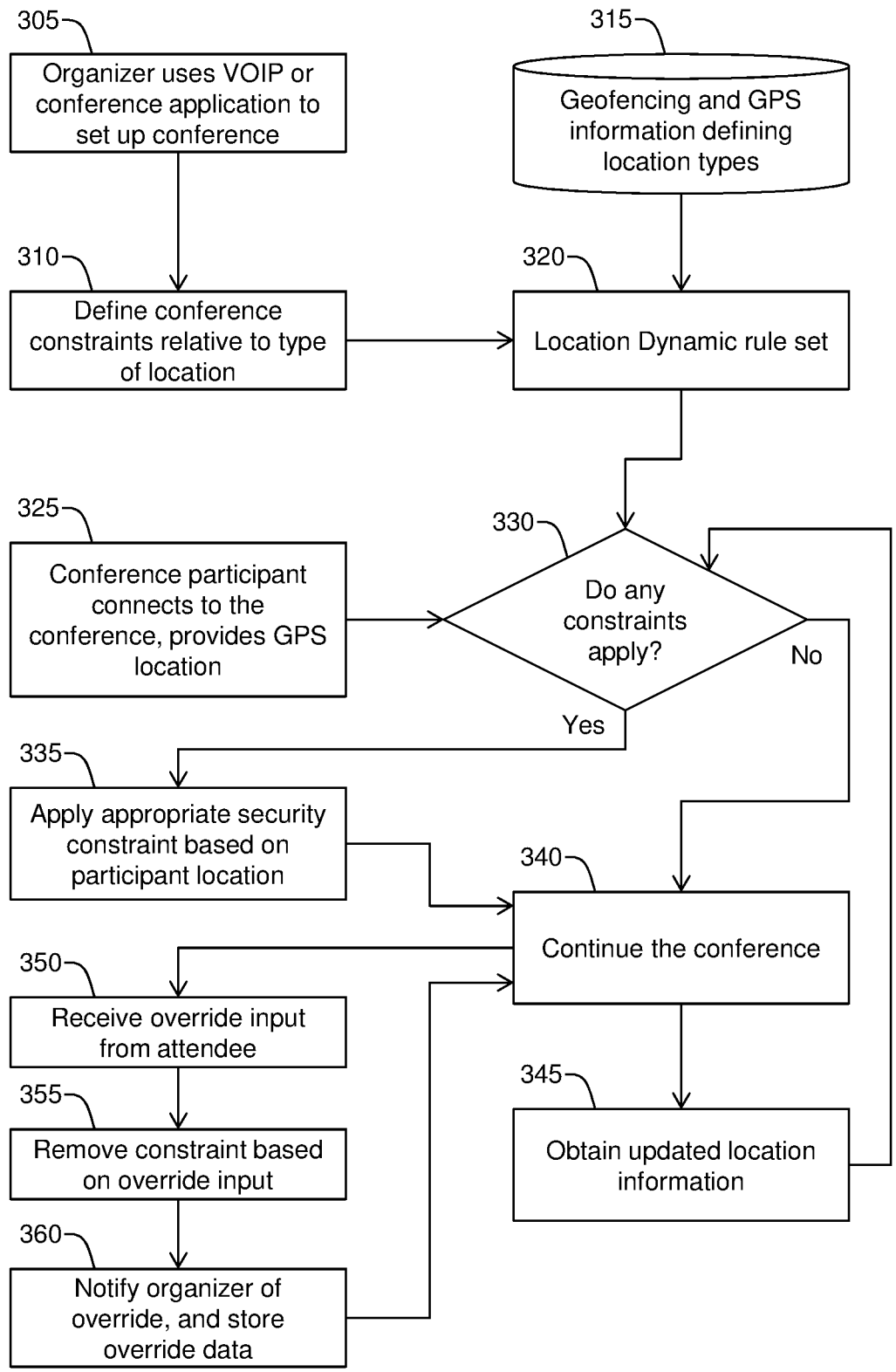
FIG. 4 shows a flowchart of an exemplary method in accordance with aspects of the invention.

FIG. 4 shows a flowchart of an exemplary method in accordance with aspects of the present invention. Steps of the method may be carried out in the environment of FIG. 2 and are described with reference to elements depicted in FIG. 2.

At step 305, the organizer configures a conference. In embodiments, and as described with respect to FIG. 2, the organizer provides input to their participant device to define the conference information such as conference date, conference time, conference connection information, and conference invitees. In a particular embodiment, the organizer provides the input via a UI of the conference app 130. Some or all of this conference information may be provided when the organizer first creates a new conference in the conference app 130. Alternatively, some of the conference information may be added to an existing (already created conference).

At step 310, the system defines conference constraints relative to location types. In some embodiments, and as described with respect to FIG. 2, the organizer provides input to their participant device to define which constraints are applied for each location type. For example, in the UI of the conference app 103, the organizer may select a location type (e.g., low risk, medium risk, high risk) and then select zero, one, or plural constraints to associate with this selected location type. As described herein, the constraints are restrictions imposed on the functionality of a participant device during the conference, and may include at least one of: disabling the speaker of the participant device; muting the microphone of the participant device; preventing the participant device from displaying screens shared by other participant devices in the conference; preventing the participant device from displaying video from other participant devices in the conference; preventing the participant device from transmitting the audio signal of the conference to an external speaker). In other embodiments at step 310, and as described with respect to FIG. 2, the system automatically defines the constraints for the conference based on analyzing the conference invite, e.g., using NLP techniques to determine whether the conference should be deemed confidential.

At step 315, the system obtains data equating locations to one of the location types used at step 310. In embodiments, and as described with respect to FIG. 2, the organizer provides input to define one or more locations as low risk and one or more locations as high risk. The system can be configured to permit the organizer to input these locations in any convenient manner, including but not limited to: typing an address into a UI of the participant device; speaking an address into a microphone of the participant device; typing GPS coordinates into a UI of the participant device; speaking GPS coordinates into a microphone of the participant device; and inputting data defining geofences, e.g., by drawing shapes on a map in the UI of the participant device. In one embodiment, any location not defined as low risk or high risk by the organizer is automatically deemed medium risk. Additionally, or alternatively, the system may be configured to access a database that includes predefined associations between certain locations and location types. In this implementation, the database is populated with plural different locations defined by GPS coordinates and/or geofences, and each location is defined as one of low risk, medium risk, and high risk. In even further embodiments, step 315 includes the system obtaining location and location type information from both the organizer and the database.

At step 320, the system generates a location dynamic rule set. In embodiments, and as described with respect to FIG. 2, the conference module 155 utilizes the user-defined constraints and location types from step 310 and the associated locations and location types from step 315 to generate a rule set that defines constraints associated with locations (e.g., GPS locations).

At step 325, the invitees connect to the conference using their participant devices 110a-n. In embodiments, and as described with respect to FIG. 2, each attendee uses the conference information (from step 305 and received in the conference invite) to connect to the conference.

Step 325 also includes the system obtaining the location of each participant device. In embodiments, and as described with respect to FIG. 2, each participant devices 110a-n periodically transmits their current location (determined via the location system 125) to the conference module 155. The transmission may be initiated by the participant devices, or may be requested by the conference module 155.

At step 330, the system determines whether any constraints apply to any of the participant devices 110a-n. In embodiments, and as described with respect to FIG. 2, the system compares the current location of a participant device (from step 325) to the locations contained in the rule set 320. If the current location of the participant device matches the location defined in one of the rules of the rule set, then the system determines that the constraint defined in that rule applies to this participant device, and at step 335 the system applies that constraint to this participant device. In embodiments, and as described with respect to FIG. 2, the conference module 155 sends a signal to the participant device to cause the participant device to apply the constraint. For example, the conference module 155 may transmit an instruction to the participant device that causes the participant device to disable its speaker, e.g., in accordance with the constraint.

In accordance with aspects of the invention, the system performs step 330 for each participant device based on the current location of each participant device. For a particular participant device, in the event the system determines a constraint applies, then that constraint is applied at step 335 and the participant device continues with the conference at step 340 with the constraint in effect. On the other hand, for a particular participant device, in the event the system determines that a constraint does not apply, then that participant device continues the conference at step 340 with no constraints in effect.

Step 345 represents a loop that occurs periodically for each participant device during the conference. At step 345, the system receives updated location information from a participant device. In embodiments, and as described with respect to FIG. 2, the participant devices each periodically send their current location to the conference module 155. In response to receiving an updated current location of a participant device at step 345, the conference module performs step 330 with the updated current location of a participant device and applies any constraints as determined applicable based on the updated current location of a participant device.

Step 350 represents the beginning of an override loop that can occur for any participant device during the conference. At step 350, one of the attendees provides input to their participant device to override a constraint that is currently applied to their participant device. In embodiments, and as described with respect to FIG. 2, the user provides override input via the UI of the conference app 130 of their device.

At step 355, the system removes the constraint on the participant device based on the override input of step 350. The removal of the constraint can occur at the device level or at the server level. For example, if the constraint is disabling the speakerphone of the participant device, then the conference app 130 on the participant device changes the settings of the participant device to allow use of the speakerphone again. In another example, when the constraint is disabling screen sharing, the conference server 155 may be the device imposing the constraint, i.e., by not transmitting screen share data to the participant device to which the constraint applies. In this example, the constraint is removed at the server, i.e., by the conference module 155 transmitting screen share data to the participant device in response to the override.

At step 360, the system notifies the organizer of the override and stores the override data. In embodiments, and as described with respect to FIG. 2, the conference module 155 stores the override data in the override log 160, and visually presents some or all of the override data to the organizer via the UI of the conference app 130 on the organizer's participant device.

As described herein, embodiments of the invention provide for a computer-implemented method comprising dynamically adjusting call functionality to one or more users in a conference call based on call metadata associated with each user of the one or more users. In embodiments, the method comprises providing manual control of call functionality to a user of the one or more users, wherein manual control of the call functionality includes determining one or more rulesets and constraints to apply, and allowing a manual override through a security module. In further embodiments, the method comprises: detecting one or more other possible locations that are designated as either unsecure or secure in proximity to a user's current location; and responsive to detecting that one or more other possible locations that are designated as unsecure in proximity to a user's current location, modifying call functionality of a device associated with the user that is being used to connect to the conference call. In some embodiments, the call metadata includes location data that indicates a public or private area, location data that indicates secure and unsecured areas. In some embodiments, the call functionality includes: controlling a user's speakerphone, headset control, outgoing audio muting, and risk notification to the one or more users.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computer device, conference information defining parameters of a conference;
receiving, by the computer device, conference constraints relative to location types;
generating, by the computer device, a rule set based on the conference constraints and the location types;
obtaining, by the computer device, location information of participant devices connected to the conference;
determining, by the computer device and for each one of the participant devices connected to the conference, whether one of the conference constraints applies to the one of the participant devices based on the location of the one of the participant devices and the rule set; and
in response to determining that one of the conference constraints applies to the one of the participant devices, the computer device applying the one of the conference constraints applies to the one of the participant devices.

2. The method of claim 1, wherein the conference constraints affect functionality of the participant devices during the conference.

3. The method of claim 2, wherein the conference constraints comprise at least one selected from the group consisting of: disabling a speaker of the participant device; muting a microphone of the participant device; preventing a participant device from displaying screens shared by other ones of the participant devices in the conference; preventing a participant device from displaying video from other ones of the participant devices in the conference; and preventing the participant device from transmitting an audio signal of the conference to an external speaker.

4. The method of claim 1, wherein the conference information and the conference constraints are both received from an organizer of the conference.

5. The method of claim 4, wherein:
the location types consist of a first location type and a second location type;

the computer device receives input from the organizer defining at least one location as the first location type; and the computer devices deems all locations different than the at least one location as being the second location type.

6. The method of claim 5, wherein the rule set defines a first set of the conference constraints with the first location type and a second set of the conference constraints with the second location type.

7. The method of claim 4, wherein:
the location types consist of a first location type, a second location type, and a third location type;
the computer device receives input from the organizer defining at least one first location as the first location type;
the computer device receives input from the organizer defining at least one second location as the second location type;
the computer devices deems all locations different than the at least one first location and the at least one second location as being the third location type.

8. The method of claim 7, wherein the rule set defines: a first set of the conference constraints with the first location type; a second set of the conference constraints with the second location type; and a third set of the conference constraints with the third location type.

9. The method of claim 1, further comprising:
receiving updated location information from one of the participant devices;
determining the one of the participant devices has moved to a different location type; and
applying a different set of the conference constraints to the one of the participant devices based on the updated location information and the rule set.

10. The method of claim 1, further comprising:
receiving an override input from a respective one of the participant devices to which one of the conference constraints is applied;
removing the one of the conference constraints from the respective one of the participant devices; and
storing override data associated with the override input in an override log.

11. The method of claim 10, further comprising displaying the override data to an organizer of the conference during the conference.

12. The method of claim 1, further comprising determining the conference should be treated as confidential by analyzing a conference invite using natural language processing, wherein the generating the rule set comprises automatically obtaining a default confidential rule set based on the determining the conference should be treated as confidential.

13. A computer program product, the computer program product comprising a computer readable storage medium having program instructions embodied therewith, the program instructions executable by a computer device to cause the computer device to:
generate a rule set based on conference constraints and location types defined by an organizer of a conference, wherein the conference comprises one of a conference call and a web meeting, and wherein the rule set defines a first set of the conference constraints with the first location type and a second set of the conference constraints with the second location type;

apply the first set of the conference constraints to a first one of the participant devices based on determining the first one of the participant devices is in a location of the first location type; and
apply the second set of the conference constraints to a second one of the participant devices based on determining the second one of the participant devices is in a location of the second location type.

14. The computer program product of claim 13, wherein the conference constraints comprise at least one selected from the group consisting of: disabling a speaker of the participant device; muting a microphone of the participant device; preventing a participant device from displaying screens shared by other ones of the participant devices in the conference; preventing a participant device from displaying video from other ones of the participant devices in the conference; and preventing the participant device from transmitting an audio signal of the conference to an external speaker.

15. The computer program product of claim 13, wherein the program instructions cause the computer device to:
determine the first one of the participant devices has moved to a location of the second location type; and
remove the first set of the conference constraints from the first one of the participant devices based on the determining the first one of the participant devices has moved to the location of the second location type; and
apply the second set of the conference constraints to the first one of the participant devices based on the determining the first one of the participant devices has moved to the location of the second location type.

16. The computer program product of claim 13, wherein the program instructions cause the computer device to:
receive an override input from the first one of the participant devices;
remove one the first set of the conference constraints from the first one of the participant devices based on the override input; and
store override data associated with the override input in an override log.

17. The computer program product of claim 16, further comprising displaying the override data to an organizer of the conference during the conference.

18. A system comprising:
a conference server comprising a processor, a computer readable memory, and a computer readable storage medium;
program instructions to receive conference information, conference constraints, and location types via input provided by an organizer of a conference;
program instructions to generate a rule set based on the conference constraints and the location types, wherein the location types consist of a first location type and a second location type;
program instructions to connect plural participant devices during the conference;
program instructions to receive location information from each of the plural participant devices during the conference;
program instructions to adjust a functionality of at least one of the plural participant devices during the conference based on the rule set and the location information of the at least one of the plural participant devices;
program instructions to receive input from the organizer defining at least one location as the first location type; and program instructions to deem all locations different than the at least one location as being the second location type, wherein the program instructions are stored on the computer readable storage medium for execution by the processor via the computer readable memory.

19. The system of claim 18, wherein the adjusting the functionality comprises applying one or more of the conference constraints to the at least one of the plural participant devices while the at least one of the plural participant devices is located in a location defined as one of the location types.

20. The system of claim 19, wherein the conference constraints comprise at least one selected from the group consisting of: disabling a speaker of the participant device; muting a microphone of the participant device; preventing a participant device from displaying screens shared by other ones of the participant devices in the conference; preventing a participant device from displaying video from other ones of the participant devices in the conference; and preventing the participant device from transmitting an audio signal of the conference to an external speaker.

\* \* \* \* \*